(12) United States Patent
Morris

(10) Patent No.: US 7,492,255 B1
(45) Date of Patent: Feb. 17, 2009

(54) ALARM AND TRACKING SYSTEM FOR MOBILE UNITS

(76) Inventor: David E. Morris, 4525 Gharrett, Missoula, MT (US) 59803

( * ) Notice: Subject to any disclaimer, the term of this patent is extended or adjusted under 35 U.S.C. 154(b) by 288 days.

(21) Appl. No.: 11/586,121

(22) Filed: Oct. 25, 2006

Related U.S. Application Data

(60) Provisional application No. 60/730,413, filed on Oct. 26, 2005.

(51) Int. Cl.
*G08B 13/00* (2006.01)

(52) U.S. Cl. .................. 340/541; 340/431; 340/438; 340/426.12; 340/539.26; 348/152

(58) Field of Classification Search ............ 340/431, 340/438, 540, 426.12, 426.1, 539.1, 539.26, 340/425.5, 539.13, 539.22; 307/10.1, 10.2; 348/143, 152, 153, 154, 155; 342/28, 58, 342/114
See application file for complete search history.

(56) References Cited

U.S. PATENT DOCUMENTS

| | | | |
|---|---|---|---|
| 5,173,052 A | 12/1992 | Duncan, Jr. | |
| 5,686,892 A | 11/1997 | Smith | |
| 5,884,221 A | 3/1999 | Wortham | |
| 5,900,815 A | 5/1999 | Story | |
| 6,166,627 A | 12/2000 | Reeley | |
| 6,356,819 B1* | 3/2002 | Winslow | 701/23 |
| 6,433,683 B1* | 8/2002 | Robinson | 340/540 |
| 6,737,962 B2* | 5/2004 | Mayor | 340/431 |
| 6,741,167 B1 | 5/2004 | Mulkey | |
| 6,803,854 B1 | 10/2004 | Adams et al. | |
| 7,034,683 B2* | 4/2006 | Ghazarian | 340/568.1 |
| 7,245,204 B2* | 7/2007 | Ramos et al. | 340/426.12 |
| 2003/0050013 A1* | 3/2003 | Parisi | 455/66 |
| 2004/0233055 A1* | 11/2004 | Canich et al. | 340/539.26 |
| 2004/0263323 A1* | 12/2004 | Seike et al. | 340/426.1 |
| 2005/0046567 A1* | 3/2005 | Mortenson et al. | 340/539.13 |
| 2005/0151628 A1* | 7/2005 | Becker et al. | 340/426.1 |
| 2005/0195101 A1* | 9/2005 | Stevens et al. | 342/28 |
| 2006/0164239 A1* | 7/2006 | Loda | 340/539.22 |

\* cited by examiner

*Primary Examiner*—George A Bugg
*Assistant Examiner*—Hoi C Lau
(74) *Attorney, Agent, or Firm*—Robert C. Montgomery

(57) ABSTRACT

A system for the detecting and alarming of unauthorized access to an enclosure is herein disclosed. Sensors mounted within the door and/or motion sensors provide a wireless signal to a centralized control panel that activates an alarm when armed. The alarm provides visual and aural indication of an intrusion within the enclosure and transmits a signal to a remote base unit via telemetry, and a Global Positioning System (GPS) may provide the location of the alarm to the base unit for subsequent dispatch of security personnel if the enclosure is in transport.

15 Claims, 3 Drawing Sheets

ALARM AND TRACKING SYSTEM FOR MOBILE UNITS

RELATED APPLICATIONS

The present invention was first described in U.S. Provisional Patent Application No. 60/730,413 filed on Oct. 26, 2005.

FIELD OF THE INVENTION

The present invention relates generally to a system for the detecting and alarming of unauthorized access to an enclosure and, more particularly, to a mobile enclosure having motion sensors within an entryway further comprising global positional system (GPS) capabilities providing a wireless signal, when armed, to a centralized monitoring service or to the proper authorities.

BACKGROUND OF THE INVENTION

Security alarms are almost common items on homes, businesses, and motor vehicles in today's society. Their use has not only stopped many attempted thefts in progress, but the knowledge that security systems are there, has stopped many more before they are even started. However, many targets still remain that are favorites with thieves and vandals. Such targets include construction or tool trailers found at construction sites. It is common knowledge that most of these units do not even have a power source to operate an alarm, much less a phone line that connects to a central office. These facts, coupled with their often remote location, unoccupied status, and valuable tools and materials contained within, typically lead to a high percentage of thefts. In fact, many of these factors make other mobile targets such as semi-trailers, rental containers, rental trucks, campers, delivery vehicles, and the like frequent targets as well. The development of the invention fulfills this need.

As its name implies, the invention concept is a system and method by which large, mobile, unoccupied, containers or vehicles are protected against theft and vandalism. While generally following the same operating sequence as conventional burglar alarms found in homes and businesses, the invention has several special properties, which make it specifically useful for mobile protection of large containers or vehicles. First, the invention is controlled by a control panel mounted on the interior of the enclosure. Secondly, it is powered by a large replaceable battery system that will provide months of operation without external power. Thirdly, the control panel communicates wirelessly with door sensors and motion sensors that are also battery operated. Finally, an external alarm horn and alarm light provide immediate indication of a possible theft in order to frighten the intruder away. It is also envisioned that upper-scale models could utilize a cellular phone interface to contact central offices. Additionally, it is also envisioned that with the addition of a GPS (Global Positioning System) interface, the invention would provide immediate two-way contact and notification of authorities with location information so law enforcement officers could be dispatched to the immediate location of the intrusion. The invention could be used on any trailer or container, but is envisioned to be specifically beneficial to contractor trailers, contractor tool trailers, semi-trailers, rental containers, rental trucks, campers, delivery vehicles, or the like. The use of this innovative system allows for increased security of unmanned portable containers in a manner which is quick, easy and effective.

Several attempts have been made in the past to protect mobile properties, such as constriction trailers and recreational vehicles, with a security system for detecting unauthorized access with a monitoring and tracking system. U.S. Pat. No. 6,737,962, in the name of Mayor, discloses an alarm system and kit with event recording for vehicles, including a housing enclosing an alarm module, battery, anti-tamper devices, a transmitter, a receiver, an unauthorized connect sensor, a reefer fault sensor, and a keypad. The Mayor device unfortunately does not disclose the use of a GPS tracking system as in the present invention.

U.S. Pat. No. 6,803,854, issued in the name of Adams et al., teaches a system and method for especially graphically monitoring and/or remote controlling stationary and/or mobile devices, which does into fall under the scope of the present invention.

U.S. Pat. No. 6,166,627, issued in the name of Reeley, discloses a mobile detection and alert system wherein the already existing vehicle security system is linked to a central monitoring facility by a transceiver in the control unit. The Reeley device does not provide for a motion detection sensor for alerting and alarming and merely relies on the existing vehicle's unauthorized entry alarm system to activate the guardian and tracking system.

U.S. Pat. No. 5,686,892, issued in the name of Smith, teaches a stolen property tracking system. The Smith patent describes the use of a stationary alarm transmitter as well as a hidden remote alarm transmitter for the stolen property that can be monitored via radio direction finders. Unfortunately, the Smith device does not teach the use of a GPS system to locate or track stolen property after detection of an alarm system as in the present invention.

U.S. Pat. No. 5,900,815, issued in the name of Story, describes a gate alarm system with an electric switch, switch activating device, an alarm, and a battery for warning of unauthorized entrance to parking lots of commercial establishments, personal residence driveways, and the like. The Story device does not involve the use of motion sensors to detect unauthorized entry across a door opening as well as transmitting an alarm signal to a control unit to activate a GPS tracking system.

U.S. Pat. No. 5,884,221, issued in the name of Wortham discloses a vehicle locating and communicating method and apparatus including a mobile cellular unit communicating with a microprocessor for divulging location information and displaying said information, for installation within a vehicle. The Wortham device also teaches the microprocessor for transmitting said information to a host controller for subsequent display. The Wortham device does not have unauthorized entry detection systems for activating a GPS tracker as in the present invention.

U.S. Pat. No. 6,741,167, issued in the name of Mulkey, teaches a trailer theft alarm, activated when a removable activator pin in an electrical circuit is withdrawn as a consequence of initial rotation of a wheel. The Mulkey device unfortunately does not provide a method for transmitting the alarm to a control unit for subsequent tracking via GPS signal and therefore does not fall under the scope of the present invention.

None of the prior art particularly describes a monitoring system utilizing GPS to track stolen mobile property such as a construction trailer including a motion detection device with audible and visual alarms. Accordingly, there is a need for a means by which the above types of vehicles, trailers and containers can be protected against theft and vandalism in much the same manner as their stationary counterparts.

SUMMARY OF THE INVENTION

In view of the foregoing disadvantages inherent in the prior art, it has been observed that there is need of a device for the detection of unauthorized entry of a secured mobile unit such as a constriction trailer or the like.

Therefore, it is an object of the present invention to provide an alarm and tracking system for mobile units, comprising at least a power source; at least one motion detector sensor electrically coupled to a control panel for detecting a presence of an unauthorized entrant and relaying signals to the control panel for recording and processing of a distress signal and status information; a control panel electrically mated to the power source, further comprising a housing attached to an interior wall of said mobile unit and housing further comprising a processor; a keypad electrically coupled to the processor and transmitting an input signal; a memory electrically coupled to the processor, including programmable software instructions to verify identity of a user, arm the system, and disarm when receiving the input signal and transmitting the distress signal and status information for further processing; a digital recording device including an interchangeable recording medium for recording the distress signal and status information received from the memory and generating a read-out display signal of the distress signal and status information; a transceiver electrically connected to the memory for receiving the distress signal and status information and transmitting the distress signal and status information to a central monitoring facility; an indicator light electrically connected to the memory for displaying an alarm setting or a disarm setting; an annunciator electrically connected to said control panel for sounding an audible alarm upon receipt of distress signal; and, an illuminator electrically connected to said control panel for visual indication of an alarm upon receipt of distress signal.

A further object of the present invention is to place the motion detector sensor(s) at an entryway of said mobile unit, wherein the entryway is a doorway, window, manway, or delivery bay.

Another object of the present invention provides for the keypad of the control panel, comprising a plurality of alphanumeric buttons wherein the input signal is a personal identification number, an "ARM" operating button wherein the input signal is a an arming operating function, and a "DISARM" operating button wherein the input signal is a disarming operating function.

Yet another object of the present invention is disclosed wherein said memory performs a set of logic functions, comprising the steps of verifying the identity of an authorized user thereby matching the personal identification number input signal against at least one stored security code, arming the system by providing power to the motion detector sensor and receiving and transmitting the distress signal and status information upon receipt of an arming operating function, and disarming the system by discontinuing power to the motion detector sensor after a preset period of time has elapsed or upon receipt of a disarming operating function.

Still yet another object of the present invention comprises a system wherein the transceiver is a phone module unit and operates on a cellular technology network for two-way communication with the central monitoring facility.

Another object of the present invention wherein said transceiver operates with a global positioning system (GPS), said GPS unit is responsive to navigation signals received by a satellite navigation system, thereby providing and relaying real-time location information, the distress signal, and status information to the central monitoring facility.

Still yet another object of the present invention comprises a remote control for transmitting the input signal to the transceiver, wherein the remote control either comprises a handheld remote control unit, operating at a pre-determined distance from said transceiver, or a telephonic communication via transmission of the input signal over a telephone communication system utilizing a telephone number keypad.

To achieve the above and other objectives the present invention provides for a method for utilizing the system comprising the steps of: installing the control panel to an interior wall of the mobile unit; installing the enunciator and illuminator to an outside wall of the mobile unit and electrically connecting each to the control panel; installing said motion detector sensors near said entryway such that said sensor(s) detect an unauthorized presence and connecting to said control panel; connecting said control panel to said power source, thereby providing power to said motion detector sensor(s), enunciator, and illuminator; inputting said personal identification number via said keypad on said control panel, whereby said memory of said control panel verifies by matching said inputted personal identification number with said stored memory code; arming said system by inputting said arming function by depressing said "ARM" operating button and verifying with said indicator light; exiting said mobile unit, whereafter said motion detector sensor(s) receive power directed thereto via said control panel; generating said distress signal and status information upon detection of an unauthorized presence; transmitting said distress signal and status information to said memory of said control panel; transmitting said distress signal and status information to said transceiver; transmitting said distress signal and status information from said transceiver to said central monitoring facility; transmitting said distress signal to said enunciator for said audible alarm and said illuminator for said visual alarm; disarming said system by inputting the disarming function by depressing the "DISARM" operating button and verifying with the indicator light, wherein the control panel discontinues power to the motion detector sensor(s).

Other methods for utilizing the present invention include utilizing a GPS tracking device within the control panel for relaying real-time location, status information, and a distress signal via the transceiver to the central monitoring facility; communicating wirelessly between the control panel and the motion control sensors, enunciator, illuminator, and/or transceiver; communicating in a two-way-communication with the central monitoring facility; inputting the personal identification number via remote control; and arming and disarming the system via remote control.

BRIEF DESCRIPTION OF THE DRAWINGS

The advantages and features of the present invention will become better understood with reference to the following more detailed description and claims taken in conjunction with the accompanying drawings in which like elements are identified with like symbols, and in which:

DESCRIPTIVE KEY

| | |
|---|---|
| 10 | alarm and tracking system for mobile units |
| 11 | trailer door |
| 14 | motion sensor |
| 20 | interior |
| 25 | mobile unit |
| 30 | central control unit |
| 33 | keypad |
| 34 | key |
| 35 | display |
| 37 | speaker |
| 38 | light |
| 39 | battery |
| 40 | enunciator |
| 42 | audible alarm |
| 45 | illuminator |
| 47 | visual alarm |
| 50 | global positioning system unit |
| 60 | remote controller |
| 65 | pushbutton |
| 67 | key ring |
| 70 | central processing unit |
| 71 | medication |
| 80 | transceiver |
| 100 | mobile telephone |
| 222 | transmitter |

DETAILED DESCRIPTION OF THE PREFERRED EMBODIMENT

Figure 1:
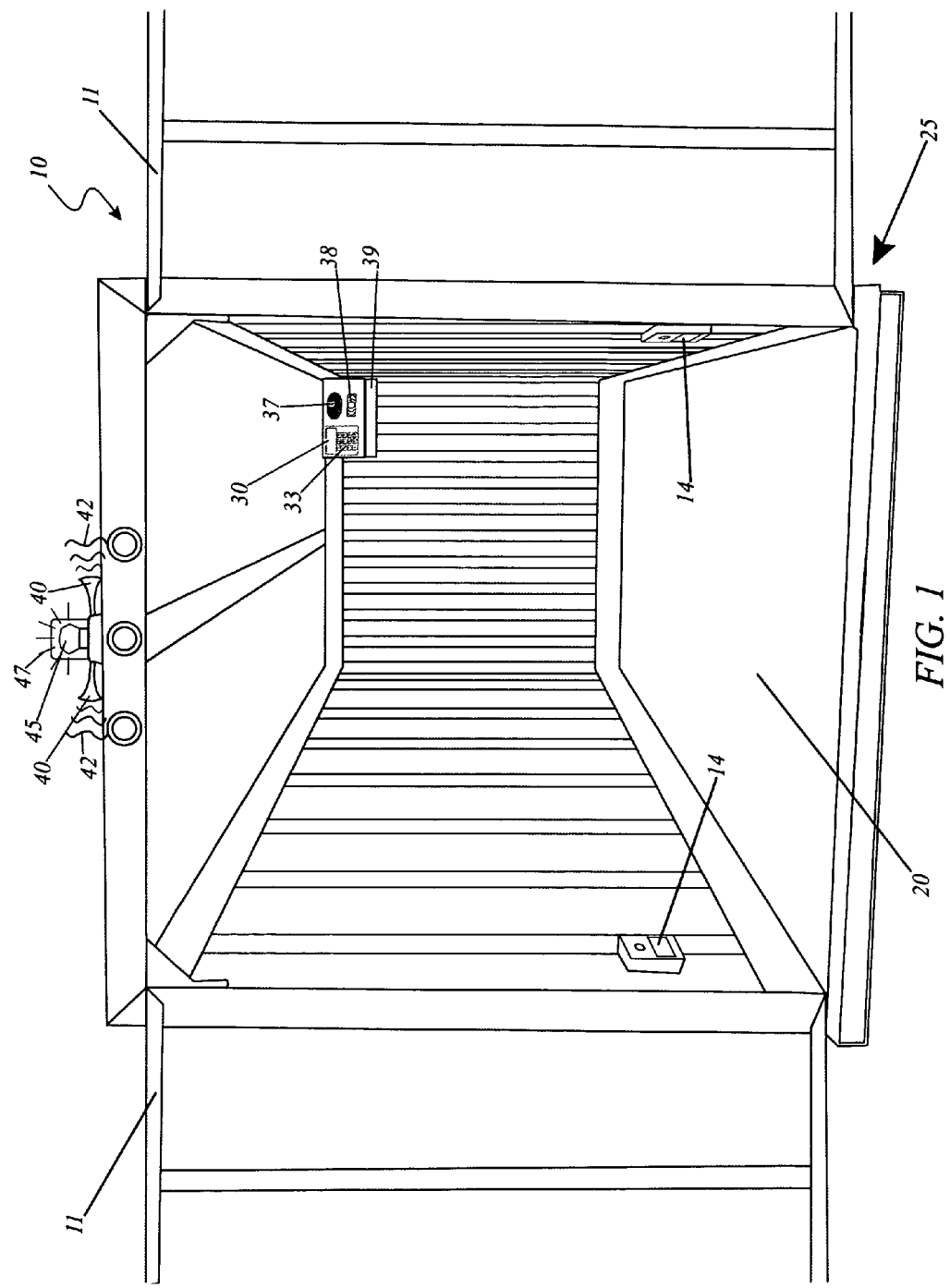
FIG. 1 is a rear view of an opened mobile unit 25 equipped with an alarm and tracking system for mobile units 10, according to a preferred embodiment of the present invention; and, FIG. 2 is a close up view of a central control unit 30 and a remote controller 60, according to a preferred embodiment of the present invention; and, FIG. 3 is an electrical block diagram of the alarm and tracking system for mobile units 10, according to a preferred embodiment of the present invention.
Figure 2:
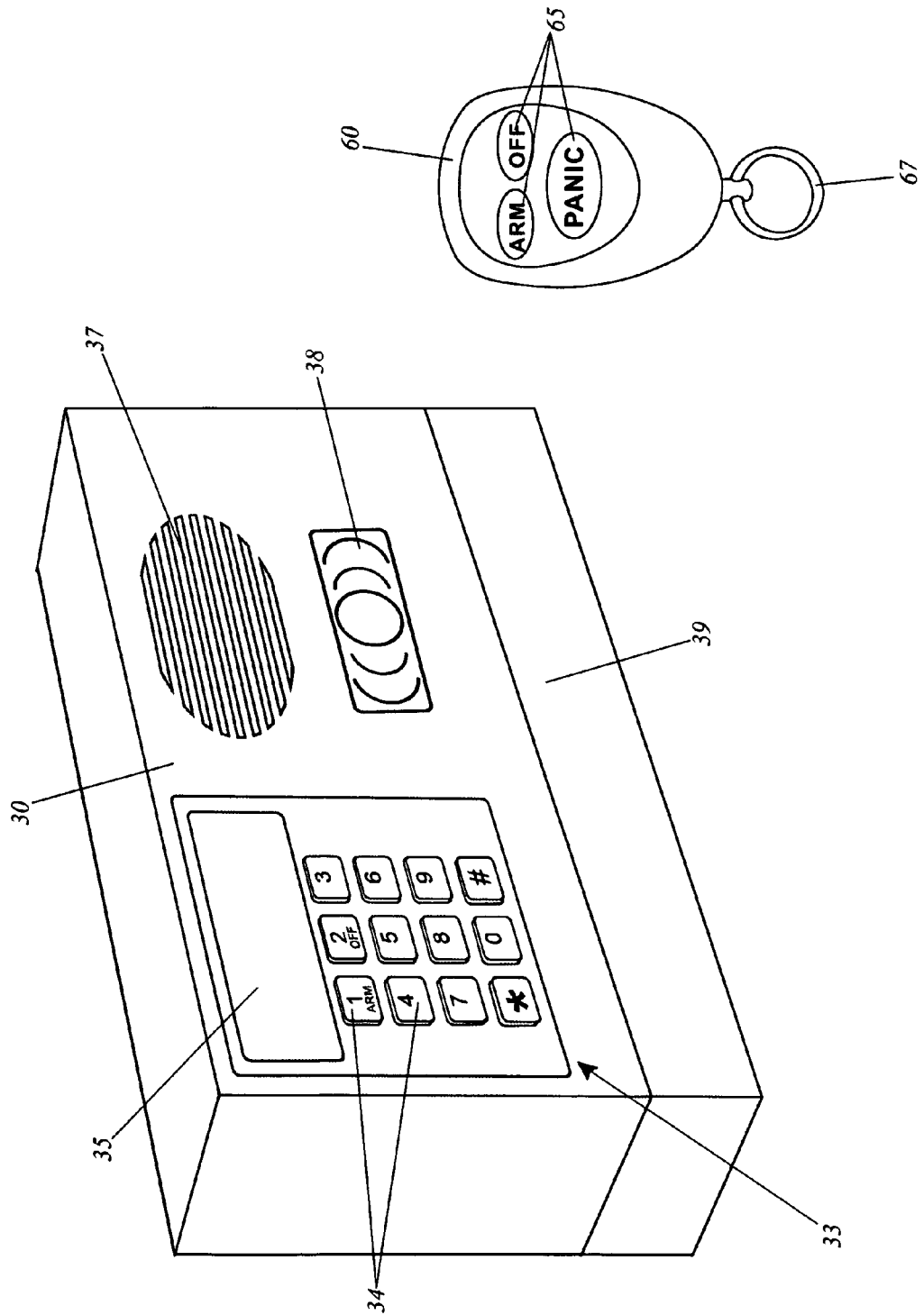
Figure 3:
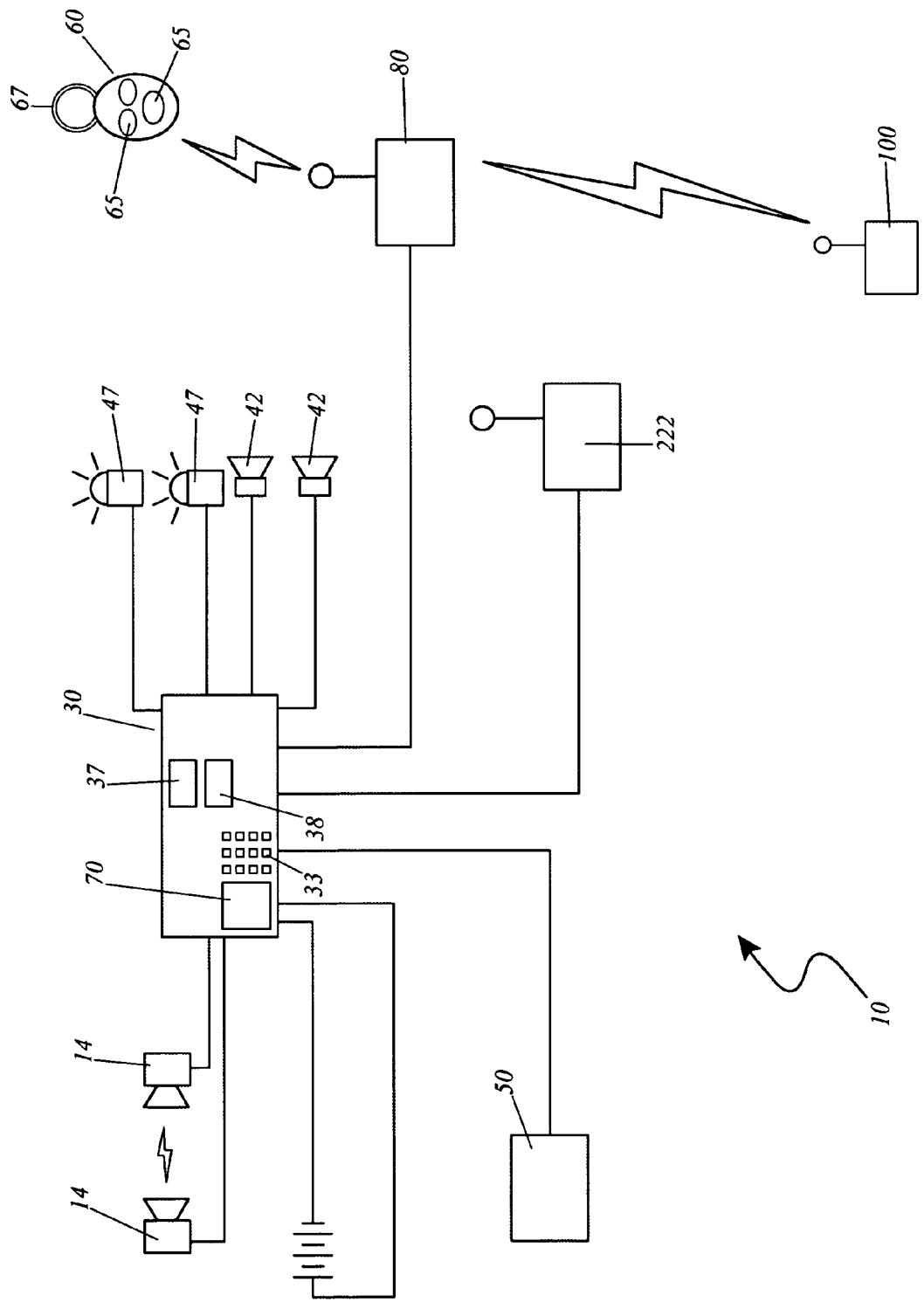

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system and method of an alarm and tracking system for mobile units 10 and other large transportation vehicles or containers and, as such, has many special properties which make it especially useful for construction trailers, box vans, or similar vehicles. The alarm and tracking system for mobile units (herein described as the "system") 10 comprises a central control unit 30, a plurality of motion sensors 14, and external indicating visual 45 and audible 40 alarming devices. Preferably, the system 10 is constructed of durable materials and possibly coated to provide environmental protection.

Referring now to FIG. 1, the system 10 is herein described as illustrated. A mobile unit 25 such as a construction trailer or box van has an interior 20 defined by three (3) side walls, a roof wall, and a set of double doors 11 that, when opened, allow access to said interior 20. An alarm system 10, comprising a central control unit 30 in electrical communication with an audible alarm 40, visual alarm 45, and motion sensors 14, is utilized for the protection of construction trailers, box vans, or similar vehicles. The central control unit 30 can be mounted on the sidewalls or adjacent to the double doors 11 as necessary and is configured to receive a telemetry signal from the motion sensors 14 and to transmit a signal to an external audible alarm 40, an external visual alarm 45, and an on-board global positioning system (GPS) unit 50. The central control unit 30 is a processor that receives input from motion sensors 14, a keypad 33, and/or a remote controller 60. The central control unit 30 detects an alarm being triggered, via the motion sensors 14, and directs an alarm signal to an enunciator 40 and an illuminator 45 to produce an audible 42 and a visual 47 alarm. The enunciator 40 and illuminator 45 provide an external visual 47 and audible 42 alarm to provide unequivocal notice of an unauthorized break-in within the interior 20 of the mobile unit 25. The system 10, when armed, waits for a pre-set interval to allow the authorized user to exit the mobile unit 25 before the motion sensors 14 are powered. The system 10 may remain activated for a pre-set amount of time or alternatively remain activated until disarmed by the user via the keypad 33 or remote controller 60. The system 10 gathers power from a rechargeable battery pack 39. The battery pack 39 is envisioned to be charged by an external power source such as, but not limited to, an electric outlet or the alternator of the truck. Alternatively, if the system 10 gathers the power from another power source, the battery 39 will function as a backup power source.

Referring now to FIG. 2, the central control unit 30 and the remote controller 60 are herein described. A keypad 33 or other input device comprising a display 35, may be utilized for the inputting and controlling of the system 10. The display 35 is envisioned to be a liquid crystal display (LCD) but may be a light-emitting diode (LED) display, a thin film transistor display, or the like for verifying operator input and/or displaying whether the system 10 is armed or disarmed. Alternatively, the digital readout may double as the display 35 and output interface for the programming of the system 10 and providing the current date and/or time. The keypad 33 comprises multi-functional numerical and operational notation keys 34, and each key 34 may be coded by color, shape, texture, or other graphic symbol for easy recognition. The keys 34 would preferably require mechanical movement for activation such as depressing or rocking. Alternately, the keypad 33 may be displayed on a touch screen apparatus, as is well known in the art. The keys 34 preferably have tactile feedback such as audible sounds including, but not limited to, beeps, chirps, or the like associated with the key structure 34 to be heard via the speaker 37. The keys 34 may be transparent and/or translucent with or without illumination devices underneath to illuminate predetermined keys 34 in the dark for easy recognition. An indicator light 38 on the central control unit 30 is envisioned to illuminate to proclaim that the system 10 is armed and/or disarmed. The keypad 33 is utilized to program the system 10 to operate as a security device to prompt the user to identify him/herself before operating. A security code or Personal Identification Number (PIN) may be programmed into the memory and later requested for each use. Once the system 10 has been tripped, the audible 42 and visual 47 alarms may be allayed by pressing the Personal Identification Numbers (PINs) into the keypad 33 and pressing the "OFF" key 34 to indicate to the central control unit 30 and alarming circuit that the user wishes to turn off the alarm.

Referring now to FIG. 3, an electronic block diagram of the system 10 is herein disclosed. Motion sensors 14 mounted on opposing sidewalls nearest the double doors 11 are positioned as to best sense movement, such as an intruder's body, when the system 10 is armed. The motion sensor 14 may be of any suitable design such as, but not limited to, passive infrared, ultrasonic, optical, microwave, or video motion detectors. Each motion sensor 14 is structured to be actuated by the occurrence of a predetermined event such as determining motion associated with unauthorized entry, glass breakage, fire, and/or other objects or occurrences, which provide motion. Such objects or conditions cause the motion sensors 14 to send an alarm signal to the central control unit 30, which, in turn, activates the external and internal visual 47 and audible 42 alarms to attract attention toward the mobile unit 25, as well as sending a distress signal to a central monitoring facility. The amount and location of motion sensors 14 depend on the mobile unit 25 that is to be protected and the amount of protection needed. The central control unit 30 comprises a central processing unit (CPU) 70 that comprises sufficient memory to store inputted data and commands from the keypad 33 provided by the user and/or the motion sensor region 14 to detect which motion sensor 14 was triggered. The CPU 70 comprises a unit that receives and responds to input received via the motion sensors 14. The responsive action may be to send the alarming signal to the enunciator 40 and the illuminator 45 as well as possibly sounding an internal visual and audible alarm via the speaker 37 and indication light 38 provided thereon the central control unit 30. The display panel 35 is in electronic communication with the CPU 70 to display outputs as a result of commands entered and/or interface information received from the resulting alarm that was triggered or the like. The central control unit 30 may send a signal to alert a central monitoring facility or the like to provide descriptive information on the alarming event associated with the mobile unit 25 being monitored.

A global positioning system (GPS) unit 50, mounted within the central control unit 30, can act as a receiver to relay real time location information to a pre-determined home base or central monitoring facility. The GPS unit 50 would be responsive to navigation signals received by a satellite navigation system, thereby providing information on the whereabouts of the stolen mobile unit 25 based on said navigation signals. The GPS unit 50 would work in conjunction with a transmitter 222 and also transmit a signal to an outside source, a central monitoring center for example, to describe the location of the mobile unit 25, the status of the alarm, and other gathered information about the system 10. It is envisioned that the transmitter 222 would be of a cellular technology type, thus relying on the cellular telephone network. Other types of transmitters 222 such as direct acting systems, radio-based systems, and satellite systems can also be used, and as such should not be interpreted as a limiting factor of the present invention. The GPS satellite system would constantly transmit precise timing and locative information based upon signals transmitted to and received from the GPS unit 50 within the central control unit 30. This provides a means to determine the location and/or the direction of unauthorized movement of the mobile unit 25 that the system 10 is installed therein.

Further, a transceiver 80 and/or a phone module unit within the central control unit 30 would receive information on a communications link, which would respond to inputs received from a remote controller 60 and/or mobile telephone 100 interfacing. Such a feature would permit the user to transmit a signal to interface with the system 10 for remote arming/disarming and/or other features via a remote controller 60 and/or mobile telephone 100. The central control unit 30 would communicate with a central monitoring facility in, at least, a one-way communication to alert said central monitoring facility of a break-in.

The remote controller 60 comprises a transmitter that emits an output signal thereto the central control unit 30 for at least one (1) command. The remote controller 60 is envisioned to be small in size such that it may fit into a pocket and/or may comprise a key ring 67 to be attached thereto car and/or home keys. Pushbuttons 65 or the like are envisioned to be electronically incorporated that may individually be actuated by depressing, rocking, or other tactile motions to emit a signal relating to the relative command pushbutton 65 depressed. Once a pushbutton 65 has been depressed, the remote controller 60 transmits an encoded signal specific to the central control unit 30, that has to be within the range of a predetermined distance. The pushbuttons 65 are envisioned to comprise command indicia imprinted thereon to designate the specific operation of each pushbutton 65 such as, but not limited to, "ARM", "PANIC", "OFF", and more. The remote controller 60 enables the user to activate or deactivate the system 10 within the perimeter of the predetermined range without physically operating the keypad 33. Although disclosed as an embodiment having a tractor-trailer configuration, an alarm system 10 maybe used in conjunction with any vehicle configuration such as, but not limited to, a van, truck, boat, camper, recreational vehicle, and more.

An alternate embodiment of the invention may disclose the entire system 10 being run off of a dedicated power train with a solar battery charger to ensure that the system 10 can be armed around the clock.

Another alternate embodiment of the invention may disclose the system 10 being hardwired such that the central control unit 30 is hardwired to the motion sensors 14, the enunciator 40, and the illuminator 45.

Yet another alternate embodiment of the present invention may disclose a plurality of other sensors or switches to be utilized in further guarding the mobile unit 25 from unauthorized entry and/or for detecting other events or conditions such as fire, carbon monoxide, and more.

The preferred embodiment of the present invention can be utilized by the common user who has little or no training in a simple and effortless manner. After initial purchase or acquisition of the system 10, it would be configured as indicated in FIGS. 1 through 3. The system 10 may be introduced as a kit or alternately be integrated within newly built mobile units 25. A control panel located in the interior of the enclosure 20 acts as a central control unit 30 to provide security, power, and process logic for the system 10. A large external replaceable battery device 39 provides months of uninterrupted service to the central control unit 30. The central control unit 30 communicates via telemetry or other wireless technology to various motion sensors 14, also powered via batteries. When the system 10 is armed and the motion sensors 14 detect the doors/windows 11 being forced open or other motion, a signal is transported from the sensors 14 to the central control unit 30 that an intrusion has occurred. The central control unit 30 then sends a signal to an external visual 45 and audible 40 alarm that provides both visual 47 and aural 42 indications that an intrusion has occurred. An additional embodiment of the present invention provides for a GPS unit 50 to provide immediate, two-way contact to a predetermined central monitoring facility or base station (such as a law or private security force) to provide location information of the mobile unit 25.

The present system 10 can be used on any transportation container or mobile unit 25 but is envisioned to be of paramount benefit to construction trailers, contractor tool trailers, rental trucks, campers, delivery vehicles, and the like. Only authorized personnel can activate and arm the system 10, which lends itself well to unmanned portable containers. When the alarms 42, 47 are activated, security personnel must reach the main contact for a personal security code, which, if not verified, may dispatch personnel to the site of the mobile unit, or, if it is in motion, to the location determined by the on-board GPS unit 50. However, the loud alarm 42 and flashing visual indication 47 are envisioned to provide enough deterrent for the intruder or thief to desist.

Upon intrusion, the motion sensors 14 send a signal to the central control unit 30, which emits an alarm signal to activate an enunciator 40 and an illuminator 45 outside of the mobile unit 25 and a speaker 37 and a light 38 integrated on the central control unit 30. The illuminator 45 and the light 38 provide a visual indication 47 that the system 10 has been triggered and the enunciator 40 and the speaker 37 provide an audible indication 42 that the system 10 has been triggered.

The motion sensors 14 are operably associated with the central control unit 30, which, in turn, is associated with the keypad 33. Once activated, the system 10 produces external and internal visual 47 and audible 42 alarms to attract the attention of people in the surrounding area and immediately establishes a two-way communication with the central monitoring facility. The system 10 may be disarmed by depressing the keys 34 in sequence associated with the programmed PIN to identify the user then a command may be entered by an operational key 34 labeled "OFF" or pushing the "OFF" pushbutton 65 on the remote controller 60. The central control unit 30 is envisioned to provide a GPS unit 50 for determining the present location of the mobile unit 25 in which it is installed. The GPS satellites are queried to provide the coordinates for the location of the mobile unit 25.

The keypad 33 comprises function keys 34 such as the pound sign "#", which may be depressed to produce a function. For example, the user may first program or reprogram his/her desired PIN number by utilizing the keypad 33 and then hit the pound sign to enter in the PIN number into the system 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A method for a visual and audible indication of an unauthorized break-in of a mobile unit and theft thereof, comprising the steps of:
   providing an alarm and tracking system for mobile units, comprising:
   a power source;
   at least one motion detector sensor electrically coupled to a control panel for detecting a presence of an unauthorized entrant, said motion detector relays signals to said control panel for recording and processing of a distress signal and status information;
   wherein said motion detector sensor is located at an entryway of said mobile unit, said entryway is a doorway, window, manway, or delivery bay;
   said control panel electrically mated to said power source, said control panel comprising a housing attached to an interior wall of said mobile unit and housing further comprising:
   a processor;
   a keypad electrically coupled to said processor and transmitting an input signal, further comprising:
   a plurality of alphanumeric buttons;
   an "ARM" operating button; and,
   a "DISARM" operating button;
   wherein said input signal is a personal identification number entered from said alphanumeric keypad, an arming operating function, or a disarming operating function;
   a memory electrically coupled to said processor, said memory including programmable software instructions that cause said system to activate said instructions when receiving said input signal from said keypad and transmitting said distress signal and status information for further processing;
   wherein said memory performs a set of logic functions comprising:
   i. verifying identity of authorized user thereby matching said personal identification number input signal against at least one stored security code;
   ii. arming said system by providing power to said motion detector sensor and receiving and transmitting said distress signal and said status information upon receipt of arming operating function; and,
   iii. disarming said system by discontinuing power to said motion detector sensor after a preset period of time has elapsed or upon receipt of disarming operating function;
   a digital recording device including an interchangeable recording medium for recording said distress signal and status information received from said memory, said digital recording device generating a readout display signal of said distress signal and status information;
   a transceiver electrically connected to said memory for receiving said distress signal and said status information and transmitting said distress signal and said status information to a central monitoring facility;
   an indicator light electrically connected to said memory for displaying an alarm setting when said arming operating function is activated or a disarm setting when said disarming operating function is activated;
   an enunciator electrically connected to said control panel for sounding an audible alarm upon receipt of said distress signal; and,
   an illuminator electrically connected to said control panel for visual indication of an alarm upon receipt of said distress signal;
   installing said control panel to an interior wall of said mobile unit;
   installing said enunciator and said illuminator to an outside wall of said mobile unit and electrically connecting each to said control panel;
   installing said motion detector sensors near said entryway such that said sensor detects an unauthorized presence and connecting to said control panel;

connecting said control panel to said power source, thereby providing power to said motion detector sensor, enunciator, and illuminator;

inputting said personal identification number via said keypad on said control panel, whereby said memory of said control panel verifies by matching said inputted personal identification number with said stored memory code;

arming said system by inputting said arming function by depressing said "ARM" operating button and verifying with said indicator light;

exiting said mobile unit, whereafter said motion detector sensors receive power directed thereto via said control panel;

generating said distress signal and status information upon detection of an unauthorized presence;

transmitting said distress signal and status information to said memory of said control panel;

transmitting said distress signal and status information to said transceiver;

transmitting said distress signal and status information from said transceiver to said central monitoring facility;

transmitting said distress signal to said enunciator for said audible alarm and said illuminator for said visual alarm;

disarming said system by inputting said disarming function by depressing said "DISARM" operating button and verifying with said indicator light, wherein said control panel discontinues power to said motion detector sensors.

2. An alarm and tracking system for mobile units, comprising:

a power source;

at least one motion detector sensor electrically coupled to a control panel for detecting a presence of an unauthorized entrant, said motion detector relays signals to said control panel for recording and processing of a distress signal and status information;

wherein said motion detector sensor is located at an entryway of said mobile unit, said entryway is a doorway, window, manway, or delivery bay;

said control panel electrically mated to said power source, said control panel comprising a housing attached to an interior wall of said mobile unit and housing further comprising:

a processor;

a keypad electrically coupled to said processor and transmitting an input signal, further comprising:

a plurality of alphanumeric buttons;

an "ARM" operating button; and, a "DISARM" operating button;

wherein said input signal is a personal identification number entered from said alphanumeric keypad, an arming operating function, or a disarming operating function;

a memory electrically coupled to said processor, said memory including programmable software instructions that cause said system to activate said instructions when receiving said input signal from said keypad and transmitting said distress signal and status information for further processing;

wherein said memory performs a set of logic functions comprising:

i. verifying identity of authorized user thereby matching said personal identification number input signal against at least one stored security code;

ii. arming said system by providing power to said motion detector sensor and receiving and transmitting said distress signal and said status information upon receipt of arming operating function after a pre-set interval; and, iii. disarming said system by discontinuing power to said motion detector sensor after a preset period of time has elapsed or upon receipt of disarming operating function;

a digital recording device including an interchangeable recording medium for recording said distress signal and status information received from said memory, said digital recording device generating a readout display signal of said distress signal and status information;

a transceiver for receiving said distress signal and said status information and transmitting said distress signal and said status information to a central monitoring facility;

an indicator light for displaying an alarm setting when said arming operating function is activated or a disarm setting when said disarming operating function is activated;

an enunciator electrically connected to said control panel for sounding an audible alarm upon receipt of said distress signal; and, an illuminator electrically connected to said control panel for visual indication of an alarm upon receipt of said distress signal.

3. The system of claim 2, wherein said transceiver operates with a global positioning system (GPS) unit, said GPS unit is responsive to navigation signals received by a satellite navigation system thereby providing and relaying real-time location information, said distress signal, and said status information to said central monitoring facility.

4. The system of claim 3, wherein said input signal is received by said transceiver and communicated to said control panel via remote control, said remote control comprising a hand-held remote control unit further comprising a keypad further comprising:

a plurality of alphanumeric buttons;

an "ARM" operating button; and, a "DISARM" operating button;

and operating at a pre-determined distance from said transceiver.

5. The system of claim 4, wherein said motion detector sensor, said enunciator, and said illuminator are in wireless communication to said control panel.

6. The system of claim 5, wherein said transceiver is a phone module unit and operates on a cellular technology network for two-way communication with said central monitoring facility.

7. The system of claim 6, wherein said power source is a rechargeable battery.

8. The system of claim 7, wherein said input signal is received by said transceiver and communicated to said control panel via remote control, said remote control transmitting said input signal over a telephone communication system utilizing a telephone number keypad.

9. The system of claim 8, wherein said distress signal and said status information is generated with other detection systems comprising one or more of the following list: limit switches, fire alarms, carbon monoxide detectors.

10. The method of claim 1, further comprising the steps of:

providing a global positioning system (GPS) unit therein said control panel, said GPS unit is responsive to navigation signals received by a satellite navigation system;

providing and relaying real-time location information, said distress signal, and said status information to said central monitoring facility.

11. The method of claim 10, further comprising the steps of:

providing a hand-held remote control unit further comprising a keypad further comprising:

a plurality of alphanumeric buttons;

an "ARM" operating button; and, a "DISARM" operating button;

and operating at a pre-determined distance from said transceiver; and, inputting said personal identification number, said arming function, and said disarming function via said hand-held remote control.

12. The method of claim 11 further comprising the step of providing a wireless communication between said control panel and either said motion detection sensors, said enunciator and said illuminator, and said transceiver or any combination thereof.

13. The method of claim 12, further comprising the step of providing a two-way communication between said transceiver and said central monitoring facility.

14. The method of claim 13 further comprising the step of providing a rechargeable battery as said power source.

15. The method of claim 13, further comprising the steps of:

providing a system wherein said input signal is received by said transceiver and communicated to said control panel via remote control, said remote control transmitting said input signal over a telephone communication system utilizing a telephone number keypad; and, inputting said personal identification number, said arming function, and said disarming function via said hand-held remote control.

* * * * *